US010640112B2

(12) United States Patent
O Meachair et al.

(10) Patent No.: US 10,640,112 B2
(45) Date of Patent: May 5, 2020

(54) METHOD OF CONTROLLING SPEED OF A VEHICLE

(71) Applicant: BENTLEY MOTORS LIMITED, Cheshire (GB)

(72) Inventors: Deaglan O Meachair, Nantwich (GB); Matthew Crumpton, Nantwich (GB)

(73) Assignee: Bentley Motors Limited, Crewe, Cheshire (GB)

(*) Notice: Subject to any disclaimer, the term of this patent is extended or adjusted under 35 U.S.C. 154(b) by 323 days.

(21) Appl. No.: 15/738,578

(22) PCT Filed: Jun. 20, 2016

(86) PCT No.: PCT/GB2016/051836
§ 371 (c)(1),
(2) Date: Dec. 21, 2017

(87) PCT Pub. No.: WO2016/207614
PCT Pub. Date: Dec. 29, 2016

(65) Prior Publication Data
US 2018/0186375 A1 Jul. 5, 2018

(30) Foreign Application Priority Data

Jun. 23, 2015 (GB) .................................. 1511052.1

(51) Int. Cl.
*B60W 30/14* (2006.01)
*B60W 50/00* (2006.01)
(Continued)

(52) U.S. Cl.
CPC .......... *B60W 30/143* (2013.01); *B60W 30/18* (2013.01); *B60W 50/0097* (2013.01);
(Continued)

(58) Field of Classification Search
CPC .............. B60W 30/143; B60W 30/18; B60W 50/0097; B60W 50/14; B60W 50/16;
(Continued)

(56) References Cited

U.S. PATENT DOCUMENTS 5,862,500 A * 1/1999 Goodwin ............... G01C 22/02
340/438
9,568,331 B1 * 2/2017 Narang .............. G01C 21/3617
(Continued)

FOREIGN PATENT DOCUMENTS

DE 102007032722 A1 2/2008
DE 102009007950 A1 10/2009
(Continued)

*Primary Examiner* — Thomas Ingram
(74) *Attorney, Agent, or Firm* — Schwabe, Williamson & Wyatt, P.C.

(57) ABSTRACT

A method of controlling the speed of a vehicle, especially an automobile, is responsive to information concerning a route and traffic. The method identifies at least a portion of an anticipated route, based on planned route data from a navigation system and/or based on data from a repeat journey logger. The method determines an optimal braking or accelerating point based on the anticipated route and outputs a sign to a driver to adjust the vehicle speed in accordance with the optimal braking or accelerating point. The method also records speed profiles of the vehicle along routes followed in a repeat journey logger and uses these speed profiles to determine an optimal braking or accelerating point. Instead of, or as well as outputting a sign to the driver, the method can adjust the speed profile of the vehicle in accordance with the optimal braking or acceleration point.

20 Claims, 3 Drawing Sheets

(51) Int. Cl.
*B60W 50/14* (2020.01)
*B60W 50/16* (2020.01)
*B60W 30/18* (2012.01)

(52) U.S. Cl.
CPC ............ *B60W 50/14* (2013.01); *B60W 50/16* (2013.01); *B60W 2050/0089* (2013.01); *B60W 2050/146* (2013.01); *B60W 2540/103* (2013.01); *B60W 2540/12* (2013.01); *B60W 2554/00* (2020.02); *B60W 2554/80* (2020.02); *B60W 2556/50* (2020.02)

(58) Field of Classification Search
CPC ..... B60W 2550/402; B60W 2050/146; B60W 2540/103; B60W 2540/12; B60W 2050/0089; B60W 2550/20; B60W 2550/30; B60W 2720/103; B60W 2530/14
See application file for complete search history.

(56) References Cited

U.S. PATENT DOCUMENTS

| | | | | |
|---|---|---|---|---|
| 2005/0125148 | A1* | 6/2005 | Van Buer | G01C 21/3617 701/468 |
| 2009/0243620 | A1* | 10/2009 | Ulinskas | G01R 31/3277 324/424 |
| 2010/0030458 | A1* | 2/2010 | Coughlin | B60W 40/09 701/123 |
| 2010/0299055 | A1* | 11/2010 | Hilbrandie | G01C 21/32 701/532 |
| 2011/0153127 | A1* | 6/2011 | Weslati | B60W 50/085 701/22 |
| 2011/0246011 | A1* | 10/2011 | Meyer-Ebeling | B60W 10/08 701/22 |
| 2011/0307130 | A1* | 12/2011 | Gow | B60G 17/0195 701/22 |
| 2012/0035798 | A1* | 2/2012 | Barfoot | G08G 1/20 701/25 |
| 2012/0330479 | A1* | 12/2012 | Oshiro | G06Q 50/30 701/1 |
| 2013/0090822 | A1* | 4/2013 | Schwindt | B60K 31/0008 701/70 |
| 2014/0277835 | A1* | 9/2014 | Filev | B60K 31/00 701/2 |
| 2014/0309837 | A1* | 10/2014 | Ham | G05D 1/0223 701/25 |
| 2015/0168157 | A1* | 6/2015 | Hoch | G01C 21/3469 701/400 |
| 2016/0267726 | A1* | 9/2016 | Soo | B60L 15/2009 |

FOREIGN PATENT DOCUMENTS

| | | |
|---|---|---|
| EP | 1029569 A2 | 8/2000 |
| GB | 2516257 A | 1/2015 |
| JP | H09226583 A | 9/1997 |
| JP | 2005297621 A | 10/2005 |
| JP | 2007221889 A | 8/2007 |
| JP | 2008101458 A | 5/2008 |
| WO | WO2007039567 A1 | 4/2007 |
| WO | WO2012049554 A1 | 4/2012 |

* cited by examiner

METHOD OF CONTROLLING SPEED OF A VEHICLE

CROSS REFERENCE TO RELATED APPLICATIONS

The present application is a national phase entry under 35 U.S.C. § 371 of International Application No. PCT/GB2016/051836, filed Jun. 20, 2016, entitled "METHOD OF CONTROLLING SPEED OF A VEHICLE," which designated, among the various States, the United States of America, and which claims priority to GB 1511052.1 filed Jun. 23, 2015, both of which are hereby incorporated by reference.

TECHNICAL FIELD OF THE INVENTION

The present invention relates to predictive vehicle control and in particular, but not exclusively to a means and a method for controlling the speed of an automobile in response to information concerning a route and traffic.

BACKGROUND TO THE INVENTION

WO2007/039567 proposes a motor vehicle system comprising a navigation system and a motor control appliance. In one embodiment of this system an ECU is controlled to change the exhaust emission based on location, setting the lowest exhaust emissions, at the expense of power, when it is determined that the vehicle is in an urban area, then changing the settings outside an urban area. In another embodiment, the vehicle is a hybrid and, in response to information from the navigation system, the ECU can select the electric motor as the only source in an urban area, the IC engine as the only source in a non-urban area and both power sources in a mountainous area.

However, this type of control is not particularly sophisticated and may be considered unsuitable in particular in luxury/performance automobiles, in which drivers are considered more likely to wish to override the system and have full power available at any time. Moreover it is crude in terms of control, switching only in response to two or three broad categories of surroundings and not taking anticipating future situations.

Also known are automatic braking systems which cause an automobile to brake in response to an input from a sensor.

So called "regeneration" systems are also well known, in which rather than using friction brakes, the speed of a hybrid or electric vehicle is reduced whilst regenerating energy, essentially by using a motor as a generator.

It is an object of embodiments of this invention to provide an improved method of automobile control, as well as an improved system for carrying out the method and an automobile incorporating such a system.

SUMMARY OF THE INVENTION

According to a one aspect of the invention there is provided a method of controlling vehicle speed comprising: identifying at least a portion of an anticipated route, based on planned route data from a navigation system, and/or based on data from a repeat journey logger; determining an optimal braking or accelerating point based on the anticipated route; and outputting a sign to a driver to adjust the vehicle speed in accordance with the optimal braking or accelerating point.

This method differs from that discussed above, in that a driver is "nudged" into following a particular speed profile, without reducing the available power at any time. Accordingly, driver behaviour can be improved, and the system can operate more sensitively as individual braking/acceleration points are determined based on a route that is anticipated, rather than just a broad category of "zone" in which the driver is currently driving. This nudging of the driver to slow down (or to reduce acceleration or coast) enables the vehicle to slow down in an optimal way, to facilitate energy recovery, or in the case of nudging the driver not to accelerate, or to coast, makes it less likely that a speed will be reached, which will have to be reduced by a sub-optimal method of deceleration (e.g. using friction brakes rather than a regenerative braking system).

Another aspect of the invention provides a method of controlling vehicle speed comprising: recording speed profiles of the vehicle along routes followed in a repeat journey logger; identifying at least a portion of an anticipated route, based on planned route data from a navigation system, and/or based on data from the repeat journey logger; determining an optimal braking or accelerating point based on the anticipated route and the speed profiles of previous journeys along the route; and (i) outputting a sign to a driver to adjust the vehicle speed in accordance with the optimal braking or accelerating point; and/or (ii) adjusting the speed of the vehicle in accordance with the optimal braking or acceleration point.

This method benefits from the learning aspect of the process. Firstly, the anticipated route can be determined based on previous journeys, which is particularly useful as routes that are regularly travelled are often not input into a navigation system, so this allows the method to operate even when a navigation system is not used.

Moreover, since previous speed profiles are taken into account in outputting the sign to the driver, or a signal to an electronic control unit, the system is able to take account of the probable conditions of the road as determined from previous journeys and the way in which the driver has previously driven the same portion of the route.

The step of determining the optimal braking or accelerating point in the first aspect of the invention mentioned above may also be based on the speed profiles of previous journeys along the route, logged in a repeat journey logger. This can achieve the same effects in terms of estimating the probable road conditions and the way the driver has driven along a particular stretch of road.

The method may comprise selecting previous journeys carried out at the closest time of day and/or day of the week to the current time for determination of the optimal braking or accelerating point. This is particularly useful in terms determining the likely future energy requirements of the vehicle, as well as estimating the probable road conditions.

The method may further comprise the step of detecting obstacles in the vehicle's path and further determining the optimal braking or accelerating point also based on whether there are any obstacles in the path. This avoids determining an optimal speed profile which is too "academic", since, for example, regardless of previous road conditions and anticipated speed limits, corners etc., if there is an obstacle, such as a slower vehicle ahead, the driver is likely to have to slow down.

The speed and rate of acceleration/deceleration of an object in the vehicle's path may also be detected and determining the optimal braking or accelerating point may also based on the speed and/or rate of acceleration/deceleration of any obstacles. This allows the method to take into account that obstacles in the road rarely remain stationary.

The method may further comprise obtaining traffic information representing the presence, and optionally the speed, of traffic along the portion of the anticipated route and determining the optimal braking or accelerating point based also on the presence and optionally the speed of any traffic. This use of traffic information obtained from an external source allows actual traffic conditions beyond the range of the sensor for detecting obstacles to be taken into account, and avoids the necessity to guess the traffic conditions based on previous journeys, when traffic information is available.

The portion of the anticipated route identified by the method may be at least 500 m—this allows for most actions that will need to be taken in the immediate future to be taken into account.

The portion of the anticipated route may be at least 1000 m—this allows more information about future turns, hills, traffic lights, traffic signals etc. which will affect the likely speed profile, to be taken into account.

The portion of the anticipated route may be at least 5 km—this allows a significant amount of data about the probable future route to be taken into account, including for example any long declines, where the regenerative braking system may be able to obtain additional energy (indicating, e.g. in a hybrid vehicle, that the speed profile/mode of operation should seek to empty the energy storage in anticipation of receiving more regenerated energy).

The portion of the anticipated route may be less than 100 km. This avoids having to take into account a complete journey when only a portion of it is likely to be relevant at any one time.

The portion of the anticipated route is less than 20 km. Similarly a portion of the route of less than 20 km is likely to be easily sufficient to take account of even significant future events such as hills which are likely to have the most significant effect on the energy use of a hybrid vehicle; requiring ideally a full storage if the hill is to be ascended, or a completely empty storage if the hill is to be descended.

The portion of the anticipated route may be less than 5 km. This is still likely to be sufficient to determine most relevant likely future events, but requires less computing power.

The portion of the anticipated route may be less than 2 km. Again less computing power is required, for a fairly significant amount of information about the future route. The range in which the portion of the route is more than 1000 m, but less than 2 km, is a particularly useful range in terms of the trade-off between anticipation of future eventualities against computing power required.

The portion of the anticipated route may be less than 1000 m. This reduces the computing power required even further.

The portion of the anticipated route may be set in dependence on the vehicle speed. This is useful as a greater distance is required to decelerate from a higher speed. Moreover, at higher speed, a vehicle is often travelling on a motorway, where many of the factors mentioned above, which require the speed profile to be altered are absent, or at least more sparse; accordingly, there is likely to be less information in relation to the future route, so a large amount of computing power should not be required A third aspect of the invention provides a vehicle comprising means for carrying out the methods discussed above, or a control system adapted to carry out the method discussed above.

The vehicle may comprise: a predictive route planner operative to output a signal comprising at least a portion of a route that the vehicle may follow based on its current location; and a control unit operative to receive the signals from the predictive route planner, and determine an optimised speed profile for the vehicle based on the signals received.

The vehicle may further comprise: a predictive route planner operative to output at least a portion of a route that the vehicle may follow based on its current location; and a control unit operative to receive the signals from the predictive route planner, and determine an optimised speed profile for the vehicle based on the signals received.

It may still further comprise a sensor operative to detect an obstacle in the vehicle's path and output a corresponding obstacle signal indicating the presence of an obstacle; wherein the control unit determines the optimised speed profile based also on the output from the sensor.

It may yet further comprise a traffic information unit operative to output a traffic signal indicating the presence of traffic and its position, and optionally its speed, wherein the control unit determines the optimised speed profile based also on the output from the traffic information unit.

It may even further comprise a repeat journey logger operative to record the route the vehicle has followed and output a signal indicative of the route followed on previous journeys based on its current location; wherein the control unit determines the optimised speed profile based also on the output from the repeat journey logger.

Such a vehicle is capable of determining an optimised speed profile based upon an anticipated route which may be based on an e.g. GPS-based navigation system with a defined destination, or information about previous journeys from which at least part of the route that is going to be followed can be anticipated. This anticipation based on previous routes allows the system to function on the basis of a predicted route, even if the navigation system is not active (which may often be the case for routes frequently travelled).

The repeat journey logger may log the time of day and/or the day of the week of previous journeys. This information is useful in determining the most likely future route as different routes are often followed regularly depending on time of day and day of the week.

The repeat journey logger may log the speed profile of previous journeys. This information may be useful in determining the likely future energy requirements of the vehicle.

The repeat journey logger may log a mode of operation of the vehicle on previous journeys. This information may be useful in determining the urgency with which the driver is expected to drive and his/her likely willingness to respond to signals.

The repeat journey logger may be operatively disablable. It is useful to be able to disable the repeat journey logger, to avoid tracking a speed profile that is unlikely to be repeated when the predictive vehicle control is operated, for example a driver in a hurry may brake later and accelerate more sharply than usual, and it may be preferred that the repeat journey logger does not record and therefore expect this type of speed profile when operative.

The control unit may output a sign based on the optimised speed profile to encourage the driver to follow the optimised speed profile The sign may be a visual, audible, or haptic alert.

A haptic alert may comprise an altered resistance in an accelerator and/or brake pedal.

Instead of or as well as outputting a sign, the control unit may output an electronic control signal to control the vehicle to follow the optimised speed profile.

The type of signal output by the control unit may be dependent on the mode of operation. For example, in an "auto" mode, the driver may choose for the vehicle to be automatically controlled to follow the optimised speed profile in the absence of any inputs. Alternatively or additionally, in an eco-mode, the driver may receive haptic "nudges" such as increased resistance of the brake or accelerator pedal. Alternatively, or additionally, in a "normal" mode, the driver may receive visual and/or audible alerts without any change to the feel of the controls.

The repeat journey logger and the predictive route planner may be integrated in a single expected route planning unit which outputs a signal indicating either a planned route to a set destination, or an expected route based on previous journeys stored in the repeat journey logger. This can reduce the computing power required by the control unit, by carrying out the function of determining an expected route separately.

The signal indicative of the expected route, output by the expected route planning unit, may take into account the current time of day and the time of day that previous journeys were logged; or the control unit may determine the expected route based on the current time of day and the time of day that previous journeys were logged in the repeat journey logger. This takes into account that similar routes are often followed at the same time each day, especially those routes which are travelled so regularly that a destination is not entered into a GPS device.

The signal indicative of the expected route, output by the expected route planning unit, may take into account current day of the week and the day of the week that previous journeys were logged; or the control unit may determines the expected route based on the current day of the week and the day of the week that previous journeys were logged in the repeat journey logger. Similarly, the day of the week is often a determining factor in the route followed—for example, every Monday-Friday a driver may turn left at a set of traffic lights on his/her way to work, whereas on a Sunday, that same driver may turn right, for example to go to church.

The vehicle may be an automobile.

DETAILED DESCRIPTION OF THE INVENTION

In order that the invention may be more clearly understood an embodiment thereof will now be described, by way of example only, with reference to the accompanying drawings, of which:

Figure 1:
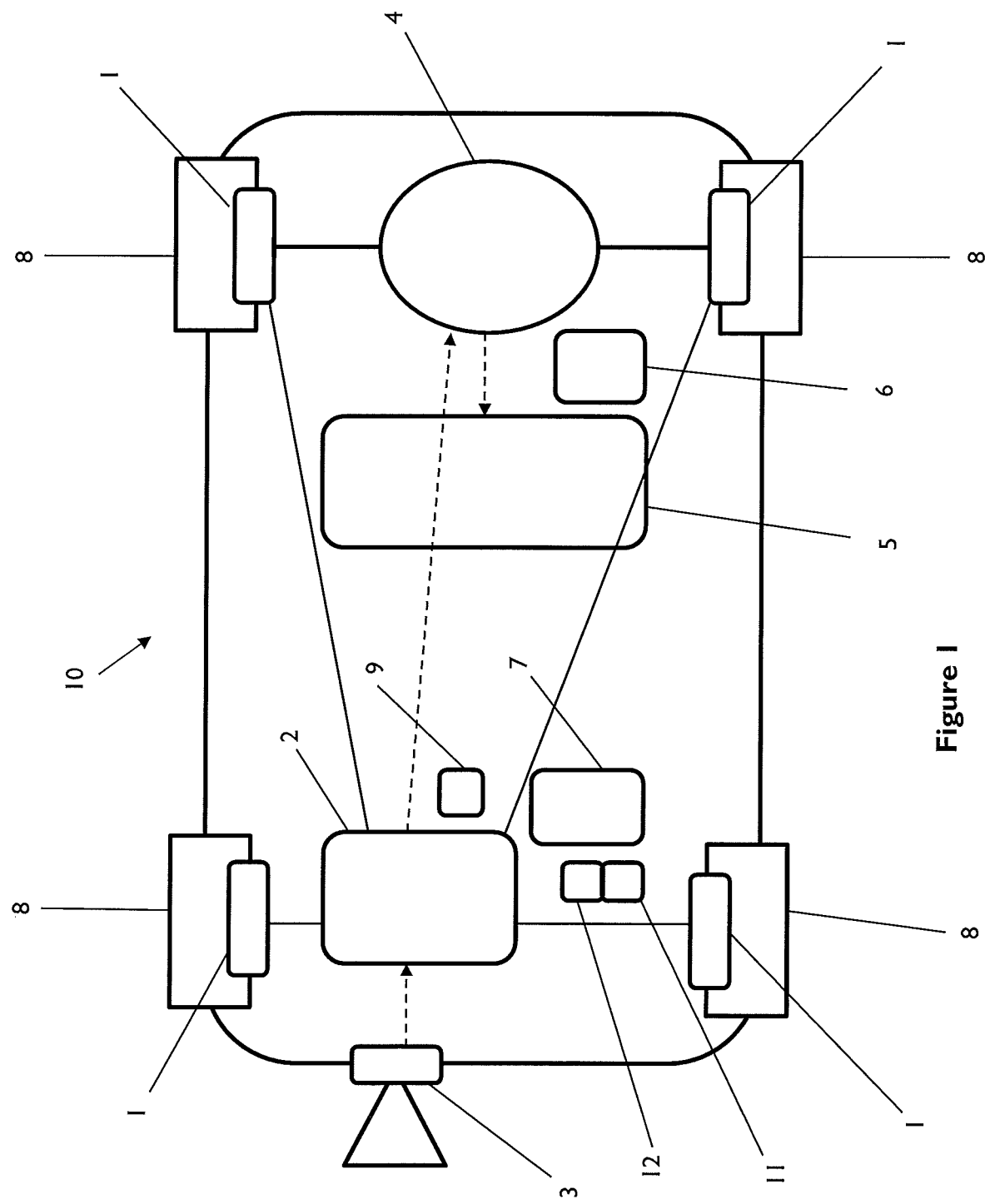
FIG. 1 is a schematic diagram of an automobile incorporating the predictive vehicle control system of the invention.

With reference to FIG. 1, an automobile 10 is a hybrid vehicle which has many conventional components, such as friction brakes 1 at each of four wheels 8. The vehicle also has an actuation and electronic stability control unit 2, which requests regenerative brake torque from the electric motor 4 to brake the rear wheels. The automobile 10 is also provided with an energy storage unit 5, which stores energy from regenerative braking and supplies it to the motor 4 under control of a regeneration controller 6. The automobile 10 also includes a traffic radar 3 arranged to detect vehicles ahead and determine their speed.

In addition to these known components, with which the skilled man will be familiar, the automobile also includes a Navigation and Real Time Traffic Electronic Control Unit (ROUTE ECU) 7. The ROUTE ECU 7 is an electronic control unit programmed to carry out predictive vehicle control in accordance with the invention.

The ROUTE ECU 7 receives information from various sources and processes it to determine optimum acceleration and deceleration strategy.

Figure 2:
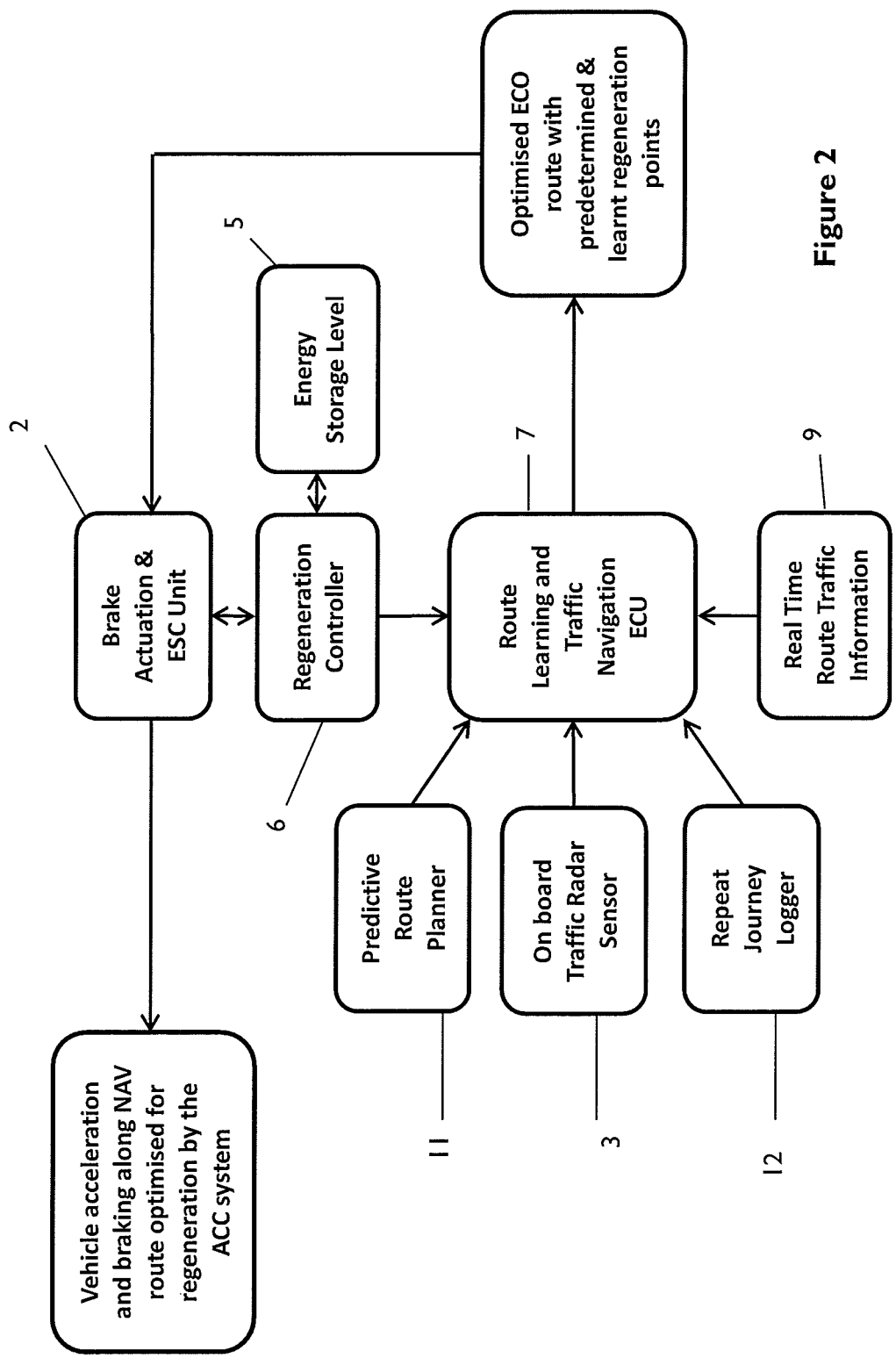
FIG. 2 is a flow diagram showing the inputs and outputs associated with the Route Learning and Traffic Navigation Engine Control Unit of FIG. 1.

FIG. 2 illustrates the data provided to the ROUTE ECU 7 and its output. As shown, the ROUTE ECU 7 receives data from the on board traffic radar sensor 3 providing information on the speed and acceleration (including deceleration) of vehicles ahead of the automobile 10 within range of the radar 3. Additional traffic data is provided by the Real Time Route Traffic Information Unit 9, which obtains traffic data for example via radio transmissions or Car2Car communication. This information is more general than the information received from the radar, indicating the general state of traffic (e.g. fast, average, slow or very slow) over a larger area based on, for example, data from traffic cameras or smart roads infrastructure.

The ROUTE ECU 7 also receives information on the expected route of the automobile 10 from the predictive route planner 11. The predictive route planner may be connected to a GPS device (not shown) to receive information on the location of the automobile 10 and its future route in accordance with a planned route, or may incorporate a GPS device. In either case, it provides the ROUTE ECU 7 with location information and a predicted future route. If no route is set, the predictive route planner simply outputs the possibilities for future choices over a certain distance.

A repeat journey logger 12 is also provided, which records the route of the journeys the automobile 10 makes, along with the time of day, and date to build up a database of routes taken at particular times and on particular days. This information is also provided to the ROUTE ECU and, if no planned route has been set and the predictive route planner is outputting a number of future choices of route, the database can be used to determine the most likely future route based on previous journeys. For example, if the ROUTE ECU 7 determines that it is 9.00 on a Monday morning and a certain left hand turn has been taken on 100% of the last ten Monday mornings logged, the ROUTE ECU 7 can determine that the automobile 10 is expected to turn left at that same junction.

The repeat journey logger 12 may also record and provide to the ROUTE ECU 7 data concerning the speed and acceleration/deceleration pattern of the automobile 10 along previous routes, at particular times. This information may be used to determine (a) the conditions on a particular road at a particular time (i.e. it may be inferred that a road is congested if a vehicle regularly travels at a speed substantially lower than the speed limit), and (b) how successful the vehicle was at utilising only regenerative braking for any deceleration event along the route. For example, based on interrogating the repeat journey logger 12, the ROUTE ECU 7 may determine that at 8.30 on a Monday morning, a certain turn is normally taken at a leisurely speed, and followed by gentle deceleration, whereas at 8.57 the same turn is taken at a higher speed and followed by aggressive deceleration. This higher deceleration would mean the vehicle may need to use both regenerative and friction brakes, so the vehicle may adjust its braking strategy and request an earlier intervention based on previous experience. Similarly, it may be determined that a particular straight part of the road is normally congested based on regular readings at say 9.00 am of a speed of say 30 mph, on a part of the road that is regularly traversed at 60 mph at 6.00 am.

In addition to this information which can be considered to relate to external factors, the ROUTE ECU 7 also receives information concerning internal information, in particular receiving an indication of the remaining capacity of the energy storage unit 5 from the regeneration controller 6.

In response to the information relating to vehicles ahead, general traffic situation, predicted route and previous acceleration/deceleration patterns, the ROUTE ECU 7 constructs and outputs an optimised "ECO" route in which regeneration points, at which regenerative braking should be used are predetermined. This information is output to the actuation and electronic stability control unit to ensure that regenerative braking, rather than friction braking is used in the optimum position and to ensure that stored energy, rather than energy generated by the on-board engine in the hybrid system, is used to power the motor 4 in advance of the regeneration points, so that there is sufficient capacity in the energy storage unit 5 when regeneration occurs. This results in acceleration and braking being optimised for regeneration along the predicted (NAV) route.

In order to ensure that regenerative braking rather than friction braking is used at the optimum position, the brake actuation and electronic stability control unit 2 may provide visual signs to the driver (e.g. displaying "BRAKE" on a Heads-Up Display, not shown), for example instructing him/her to begin braking at a certain point, in order to avoid the requirement for sudden braking, necessitating use of the friction brakes. Additionally, the actuation and electronic stability control unit 2 may, as discussed above, ensure that regenerated energy from the energy storage unit 5 is used before entering the braking zone. Furthermore, the actuation and electronic speed control unit 2 may brake the automobile 10 without any input to the brake pedal (not shown). The brake pedal may have a detent position, and the actuation and electronic stability control unit 2 may, having determined based on the input from the radar 3 that excessive braking is not required, brake gently, using only the regenerative braking system 6 unless the driver pushes the brake pedal past the detent position.

Similarly, in the event that the ROUTE ECU determines that acceleration is required, but it will be necessary to brake soon, the ROUTE ECU may accelerate gently using less power than would normally be used for a given accelerator position, unless the accelerator is pushed past a similar detent position. The accelerator may have a further "kick-down" detent position as is conventional in cars with automatic transmissions, which would be reached after the "eco" detent position had been passed.

Figure 3:
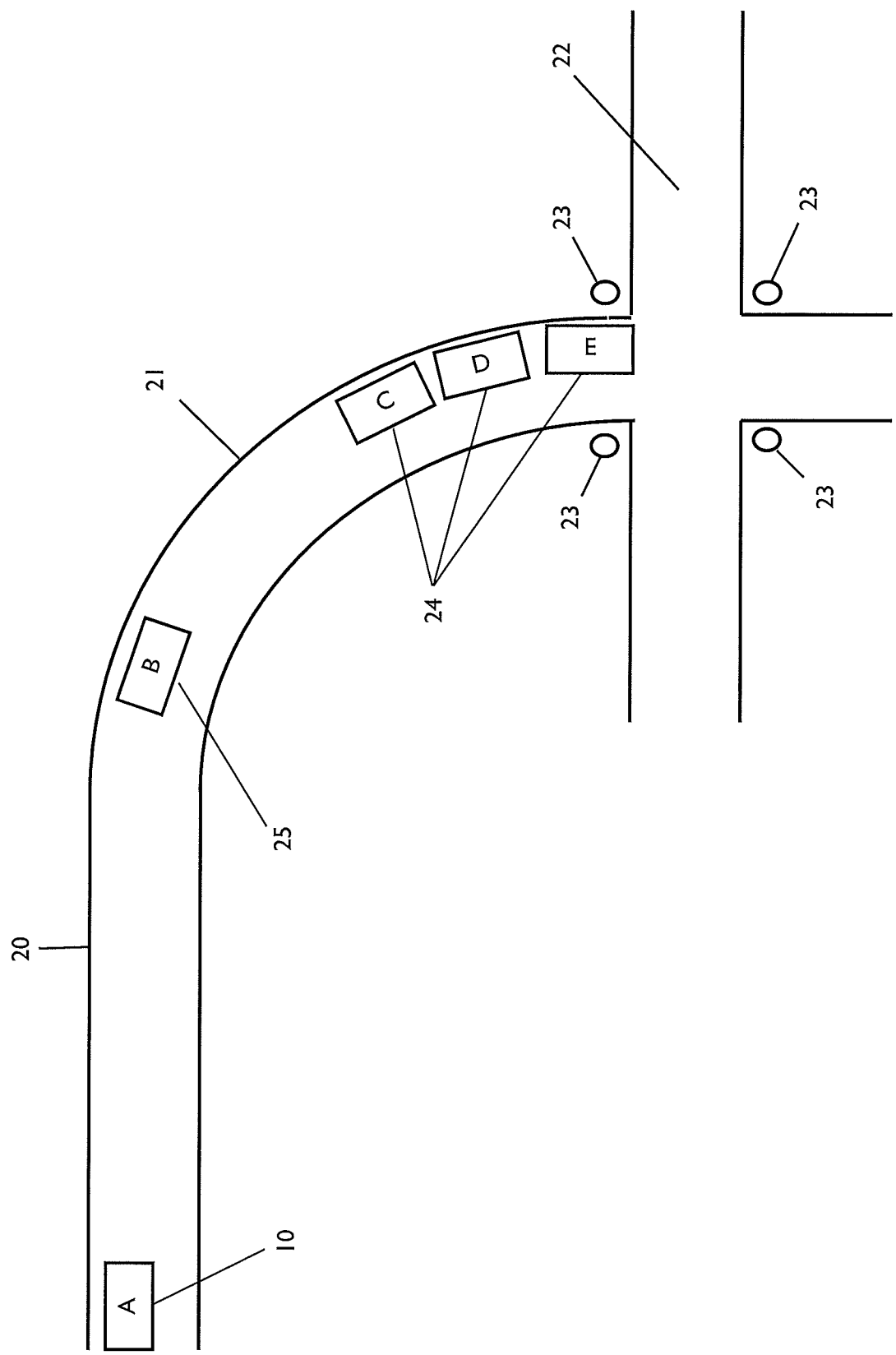
FIG. 3 is a schematic diagram of the automobile of FIG. 1 and further vehicles in an exemplary traffic situation.

An example of the method carried out by the predictive vehicle control system of the invention is described with reference to FIG. 3. FIG. 3 shows a typical road, in which a straight road 20 curves right at a bend 21 at the end of which is a cross road 22 which cannot be seen from the straight road 20 and is controlled by traffic lights 23. In the example, three queuing automobiles 24 are waiting at the junction and a further slowing vehicle 25 is braking as it turns the corner. The automobile 10 of the invention is driving some distance behind the slowing vehicle 25 along the straight road 20 towards the bend 21. The queuing vehicles 24 on the bend are obscured from view and cannot be detected by the radar 3, but it detects the position of the slowing vehicle 25 and its rate of deceleration and inputs that information into the ROUTE ECU 7. Meanwhile, the real time route traffic information unit 9 may receive information indicating that traffic is stationary at the traffic lights, or use knowledge of previous velocity profiles for this section of the road to infer the presence of queueing vehicles and input corresponding data to the ROUTE ECU 7. The predictive route planner inputs route data to the ROUTE ECU 7 indicating where the bend 21 in the road occurs, the position of the cross road 22 and the three options for action at the cross road 22. The repeat journey logger inputs information relating to the previous routes taken. In this example indicating that on all of the last 10 journeys along this road, the automobile 10 has travelled straight on, across the cross road 22.

The ROUTE ECU 7 therefore determines on the basis of this information that, because of the slowing vehicle 25 it will be necessary to brake soon and because of the stationary vehicles 24 it is likely that it will be necessary to brake to a complete halt. Thus the optimal braking point is determined by the ROUTE ECU. Accordingly, a sign, e.g. "COAST" on a HUD is given to the driver to encourage him to cease acceleration and acceleration and braking is optimised by reducing the accelerator response before the "eco" detent position and using the regenerated energy for any acceleration. Then when the driver removes his foot from the accelerator and places it gently on the brake pedal (before the detent position), the regenerative braking is activated to reduce the speed of the automobile 10 so that it optimises the deceleration event for maximum recovery. The radar 3 and traffic information unit 9 continue to provide input in relation to the traffic and, assuming that the queuing vehicles do not begin to move away and the driver does not press the accelerator, the ROUTE ECU 7 controls the regenerative braking, in this example, to gently bring the vehicle to a halt. If the queuing vehicles move away and the slowing vehicle 25 ceases to brake, the regenerative braking system ceases to brake the automobile 10, despite the brake pedal being actuated, because it has not passed the detent position and allows the automobile 10 to coast, ready to accelerate around the bend and across the cross road.

In this same situation, if the driver did not take his foot off the accelerator, but it was before the eco detent, the accelerator response would be reduced, so as to maintain the vehicle beneath 50 kph. In the event that the driver did not take his foot of the accelerator and it was beyond the eco detent, the vehicle would react as normal, maintaining the desired speed/acceleration/deceleration. In the event that the driver pushed the accelerator pedal to the kick-down position despite the sign being given to encourage deceleration, the vehicle would again react as normal, continuing to accelerate towards Vmax until pressure on the pedal is reduced.

In the event that the driver's foot was placed on the brake pedal beyond the "eco" detent position, the vehicle would increase the regenerative braking in accordance with the normal response of the vehicle and if it was necessary to use friction braking in addition to regenerative braking, e.g. hydraulic, pressure would be applied to the friction brake callipers, so as to achieve the expected brake response.

The above embodiment is described by way of example only. Many variations are possible without departing from the scope of the invention as defined in the appended claims.

For example, a visual signal has been discussed above to encourage the driver to coast or brake, but alternatively or additionally, the system may provide feedback to encourage coasting by loading the accelerator pedal, so that it pushes back against the driver's foot.

The invention claimed is:

1. A vehicle comprising means for carrying out a method of controlling vehicle speed, or comprising a control system adapted to carry out a method of controlling vehicle speed;

the vehicle comprising a predictive route planner operative to output a signal comprising at least a portion of a route that the vehicle may follow based on its current location; a repeat journey logger operative to record the route the vehicle has followed and output a signal indicative of the route followed on previous journeys based on its current location; and a control unit operative to receive the signals from the predictive route planner and the repeat journey logger and determine an optimum speed profile for the vehicle based on the signals received; the repeat journey logger being operatively disableable and being disabled by selecting a mode of operation;

the method comprising:

recording speed profiles of the vehicle along routes followed in the repeat journey logger;

identifying at least a portion of an anticipated route, based on planned route data from a navigation system, and/or based on data from the repeat journey logger;

determining an optimal braking or accelerating point based on the anticipated route and the speed profiles of previous journeys along the route; and (i) outputting a sign to a driver to adjust his speed profile in accordance with the optimal braking or accelerating point; and/or (ii) adjusting the speed profile of the vehicle in accordance with the optimal braking or acceleration point.

2. A vehicle according to claim 1 further comprising a sensor operative to detect an obstacle in the vehicle's path and output a corresponding obstacle signal indicating the presence of an obstacle; wherein the control unit determines the optimised speed profile based also on the output from the sensor.

3. A vehicle according to claim 1 further comprising a traffic information unit operative to output a traffic signal indicating the presence of traffic and its position, and optionally its speed, wherein the control unit determines the optimised speed profile based also on the output from the traffic information unit.

4. A vehicle according to claim 1 further comprising a repeat journey logger operative to record the route the vehicle has followed and output a signal indicative of the route followed on previous journeys based on its current location; wherein the control unit determines the optimised speed profile based also on the output from the repeat journey logger.

5. A vehicle according to claim 4 wherein the repeat journey logger logs the time of day, or the day of the week of previous journeys.

6. A vehicle according to claim 4 wherein the repeat journey logger logs the speed profile of previous journeys.

7. A vehicle according to claim 4 wherein the repeat journey logger logs a mode of operation of the vehicle on previous journeys.

8. A vehicle according to claim 4 wherein the repeat journey logger and the predictive route planner are integrated in a single expected route planning unit which outputs a signal indicating either a planned route to a set destination, or an expected route based on previous journeys stored in the repeat journey logger.

9. A vehicle according to claim 4 wherein the signal indicative of the anticipated route output by the expected route planning unit, takes into account the current time of day and the time of day that previous journeys were logged; or wherein the control unit determines the anticipated route based on the current time of day and the time of day that previous journeys were logged in the repeat journey logger.

10. A vehicle according to claim 4 wherein the signal indicative of the anticipated route, output by the expected route planning unit, takes into account current day of the week and the day of the week that previous journeys were logged; or wherein the control unit determines the anticipated route based on the current day of the week and the day of the week that previous journeys were logged in the repeat journey logger.

11. A vehicle according to claim 1 wherein the control unit outputs a sign based on the optimised speed profile to encourage the driver to follow the optimised speed profile.

12. A vehicle according to claim 11 wherein the sign is a visual, audible, or haptic alert.

13. A vehicle according to claim 12 wherein the haptic alert comprises an altered resistance in an accelerator and/or brake pedal.

14. A vehicle according to claim 11 wherein the type of sign or signal output by the control unit is dependent on the mode of operation.

15. A vehicle according to claim 1, wherein the control unit outputs an electronic control signal to control the vehicle to follow the optimised speed profile.

16. A vehicle comprising means for carrying out a method of controlling vehicle speed, or comprising a control system adapted to carry out a method of controlling vehicle speed;

the vehicle comprising a predictive route planner operative to output a signal comprising at least a portion of a route that the vehicle may follow based on its current location; a repeat journey logger operative to record the route the vehicle has followed and output a signal indicative of the route followed on previous journeys based on its current location; and a control unit operative to receive the signals from the predictive route planner and the repeat journey logger and determine an optimum speed profile for the vehicle based on the signals received; the repeat journey logger being operatively disableable and being disabled by selecting a mode of operation;

the method comprising:

identifying at least a portion of an anticipated route, based on planned route data from a navigation system and/or based on data from a repeat journey logger;

determining an optimal braking or accelerating point based on the anticipated route; and outputting a sign to a driver to adjust the vehicle speed in accordance with the optimal braking or accelerating point.

17. A vehicle according to claim 16 wherein the method of controlling vehicle speed comprises also detecting the speed and rate of acceleration/deceleration of an object in the vehicle's path and wherein determining the optimal braking or accelerating point is also based on the speed and/or rate of acceleration/deceleration of any obstacles.

18. A vehicle according to claim 16 further comprising a repeat journey logger operative to record the route the vehicle has followed and output a signal indicative of the route followed on previous journeys based on its current location; wherein the control unit determines the optimised speed profile based also on the output from the repeat journey logger.

19. A vehicle according to claim 18 wherein the repeat journey logger logs the speed profile of previous journeys.

20. A vehicle according to claim 18 wherein the control unit outputs a sign based on the optimised speed profile to encourage the driver to follow the optimised speed profile.

* * * * *